United States Patent
Bennette (10) Patent No.: US 11,277,892 B2
(45) Date of Patent: Mar. 15, 2022

(54) SYSTEMS, DEVICES, AND METHODS FOR IMPLEMENTING SPECTRAL REFLECTANCE IMAGING USING NARROW BAND EMITTERS

(71) Applicant: Electronic Theatre Controls, Inc., Middleton, WI (US)

(72) Inventor: Adam Bennette, London (GB)

(73) Assignee: Electronic Theatre Controls, Inc., Middleton, WI (US)

( * ) Notice: Subject to any disclaimer, the term of this patent is extended or adjusted under 35 U.S.C. 154(b) by 0 days.

(21) Appl. No.: 16/832,475

(22) Filed: Mar. 27, 2020

(65) Prior Publication Data

US 2020/0314320 A1   Oct. 1, 2020

Related U.S. Application Data

(60) Provisional application No. 62/829,859, filed on Apr. 5, 2019, provisional application No. 62/826,449, filed
(Continued)

(51) Int. Cl.
*H04N 5/235* (2006.01)
*H04N 13/254* (2018.01)
(Continued)

(52) U.S. Cl.
CPC ............ *H05B 45/10* (2020.01); *A01G 7/045* (2013.01); *F21S 10/06* (2013.01); *G06F 3/0482* (2013.01);
(Continued)

(58) Field of Classification Search
None
See application file for complete search history.

(56) References Cited

U.S. PATENT DOCUMENTS 9,897,484 B1   2/2018   Gopalakrishnan et al.
2017/0124402 A1*   5/2017   Tanaka ................ G02B 5/3025
(Continued)

OTHER PUBLICATIONS

International Search Report and Written Opinion for Application No. PCT/US2020/025250 dated Jul. 29, 2020 (14 pages).
(Continued)

*Primary Examiner* — Samuel D Fereja
(74) *Attorney, Agent, or Firm* — Michael Best & Friedrich LLP (57) ABSTRACT

A system for obtaining a multispectral image of a scene includes a first light source, a second light source, at least one imaging sensor, and a controller. The first light source emits light in a first wavelength range. The second light source emits light in a second wavelength range. The at least one imaging sensor senses light in the first wavelength range reflected off of the scene during a first illumination sensing period and senses light in the second wavelength range reflected off of the scene during a second illumination sensing period. The controller is electrically coupled to the at least one imaging sensor. The controller interprets signals received from the at least one imaging sensor as imaging data, stores the imaging data, and analyzes the imaging data with regard to multiple dimensions. The first illumination sensing period and the second illumination sensing period are discrete time periods.

20 Claims, 5 Drawing Sheets

Related U.S. Application Data on Mar. 29, 2019, provisional application No. 62/826,434, filed on Mar. 29, 2019, provisional application No. 62/826,445, filed on Mar. 29, 2019.

(51) Int. Cl.

| | |
|---|---|
| *H04N 13/271* | (2018.01) |
| *H04N 5/33* | (2006.01) |
| *H05B 45/10* | (2020.01) |
| *H05B 45/325* | (2020.01) |
| *A01G 7/04* | (2006.01) |
| *H04N 5/225* | (2006.01) |
| *H05B 45/22* | (2020.01) |
| *G06F 3/0482* | (2013.01) |
| *G06F 3/04847* | (2022.01) |
| *G06F 3/14* | (2006.01) |
| *H05B 47/16* | (2020.01) |
| *H05B 45/335* | (2020.01) |
| *F21S 10/06* | (2006.01) |
| *F21W 131/109* | (2006.01) |

(52) U.S. Cl.
CPC ............ *G06F 3/04847* (2013.01); *G06F 3/14* (2013.01); *H04N 5/2256* (2013.01); *H04N 5/2351* (2013.01); *H04N 5/2354* (2013.01); *H05B 45/22* (2020.01); *H05B 45/325* (2020.01); *H05B 45/335* (2020.01); *H05B 47/16* (2020.01); *F21W 2131/109* (2013.01)

(56) References Cited

U.S. PATENT DOCUMENTS

| | | | |
|---|---|---|---|
| 2018/0313760 A1* | 11/2018 | Kramer | G01N 21/6486 |
| 2019/0109984 A1* | 4/2019 | Good | H04N 5/2354 |
| 2020/0166646 A1* | 5/2020 | Van Der Sijde | H04N 9/045 |

OTHER PUBLICATIONS

Park et al., "Multispectral Imaging Using Multiplexed Illumination", downloaded Dec. 8, 2021, from IEEE Xplore, (8 Pages).

* cited by examiner

SYSTEMS, DEVICES, AND METHODS FOR IMPLEMENTING SPECTRAL REFLECTANCE IMAGING USING NARROW BAND EMITTERS

RELATED APPLICATIONS

This application claims the benefit of U.S. Provisional Patent Application No. 62/826,434, filed Mar. 29, 2019, U.S. Provisional Patent Application No. 62/826,445, filed Mar. 29, 2019, U.S. Provisional Patent Application No. 62/826,449, filed Mar. 29, 2019, and U.S. Provisional Patent Application No. 62/829,859, filed, Apr. 5, 2019, the entire contents of each of which is hereby incorporated by reference.

FIELD

Embodiments described herein relate to spectral reflectance imaging.

SUMMARY

Spectral reflectance imaging can be used to analyze plants or crops for development and disease detection. Spectral reflectance imaging can also be used to analyze paintings or other colored objects to determine the method of production, materials used, or to detect forgeries and repairs. Conventional spectral reflectance imaging uses a wideband illuminant (e.g., broadband white light, daylight, an electric light source of known spectral content, etc.) and a specialized camera (e.g., a multispectral or hyperspectral camera). Such cameras implement a series of precision band-pass filters, which typically include dichroic filters, diffraction gratings, etc. Such cameras are also bulky, complex, and prohibitively expensive.

Embodiments described herein provide systems, devices, and methods for obtaining a multispectral image using a comparatively less expensive imaging sensor (e.g., a monochrome camera) and by lighting a scene using a sequence of narrow band emitters. One narrow band emitter can be used for each waveband of interest. In some embodiments, such a technique is implemented in an obscured or low ambient light environment (e.g., not outdoors or in the presence of daylight). Illumination is provided by a collection of narrow band emitters (e.g., LEDs, tunable diffused laser, etc.). A controller collects and stores a set of images or image data sets obtained from the imaging sensor and analyzes the images in multiple dimensions. For example, a first and second dimension correspond to x-y spatial dimensions of an imaged object. A third dimension corresponds to the spectral dimension and the spectral content of an image is analyzed. In some embodiments, implementation of time-lapse imaging by the controller provides a fourth dimension of image analysis. The results of the image analysis can then be used to, for example, monitor plants or crops for distress or disease.

Systems described herein provide for obtaining a multispectral image of a scene. The systems include a first light source, a second light source, at least one imaging sensor, and a controller. The first light source emits light in a first wavelength range onto the scene. The second light source emits light in a second wavelength range onto the scene. The at least one imaging sensor senses light in the first wavelength range reflected off of the scene during a first illumination sensing period and senses light in the second wavelength range reflected off of the scene during a second illumination sensing period. The controller is connected to the at least one imaging sensor. The controller receives signals from the at least one imaging sensor as imaging data, stores the imaging data, and analyzes the imaging data with regard to multiple dimensions. The first illumination sensing period and the second illumination sensing period are discrete time periods.

Systems described herein provide for obtaining a multispectral image of a scene. The systems include a first light source, a second light source, a first imaging device, and a second imaging device. The first light source emits light in a first wavelength range onto the scene. The second light source emits light in a second wavelength range onto the scene. The first imaging device includes a first imaging sensor and a first controller. The first imaging sensor senses light in the first wavelength range reflected off of the scene during a first illumination sensing period. The first controller is connected to the first imaging sensor. The first controller receives signals from the first imaging sensor as first imaging data, stores the first imaging data, and analyzes the first imaging data with regard to a plurality of dimensions. The second imaging device includes a second imaging sensor and a second controller. The second imaging sensor senses light in the second wavelength range reflected off of the scene during a second illumination sensing period. The second controller is connected to the second imaging sensor. The second controller receives signals from the second imaging sensor as second imaging data, stores the second imaging data, and analyzes the second imaging data with regard to multiple dimensions. The first illumination sensing period and the second illumination sensing period are discrete time periods.

Methods described herein provide for obtaining a multispectral image of a scene. The methods include directing light in a first wavelength range onto the scene, detecting the light in the first wavelength range after the light has reflected off of the scene during a first illumination sensing period, storing first imaging data corresponding to the detected light in the first wavelength range, directing light in a second wavelength range onto the scene after the first illumination sensing period, detecting the light in the second wavelength range after the light has reflected off of the scene during a second illumination sensing period, storing second imaging data corresponding to the detected light in the second wavelength range, and analyzing the first imaging data and the second imaging data for one or more patterns.

Before any embodiments are explained in detail, it is to be understood that the embodiments are not limited in application to the details of the configuration and arrangement of components set forth in the following description or illustrated in the accompanying drawings. The embodiments are capable of being practiced or of being carried out in various ways. Also, it is to be understood that the phraseology and terminology used herein are for the purpose of description and should not be regarded as limiting. The use of "including," "comprising," or "having" and variations thereof are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects may be implemented in software (e.g., stored on non-transitory computer-readable medium) executable by one or more processing units, such as a microprocessor and/or application specific integrated circuits ("ASICs"). As such, it should be noted that a plurality of hardware and software based devices, as well as a plurality of different structural components, may be utilized to implement the embodiments. For example, "servers" and "computing devices" described in the specification can include one or more processing units, one or more computer-readable medium modules, one or more input/output interfaces, and various connections (e.g., a system bus) connecting the components.

DETAILED DESCRIPTION

Figure 1:
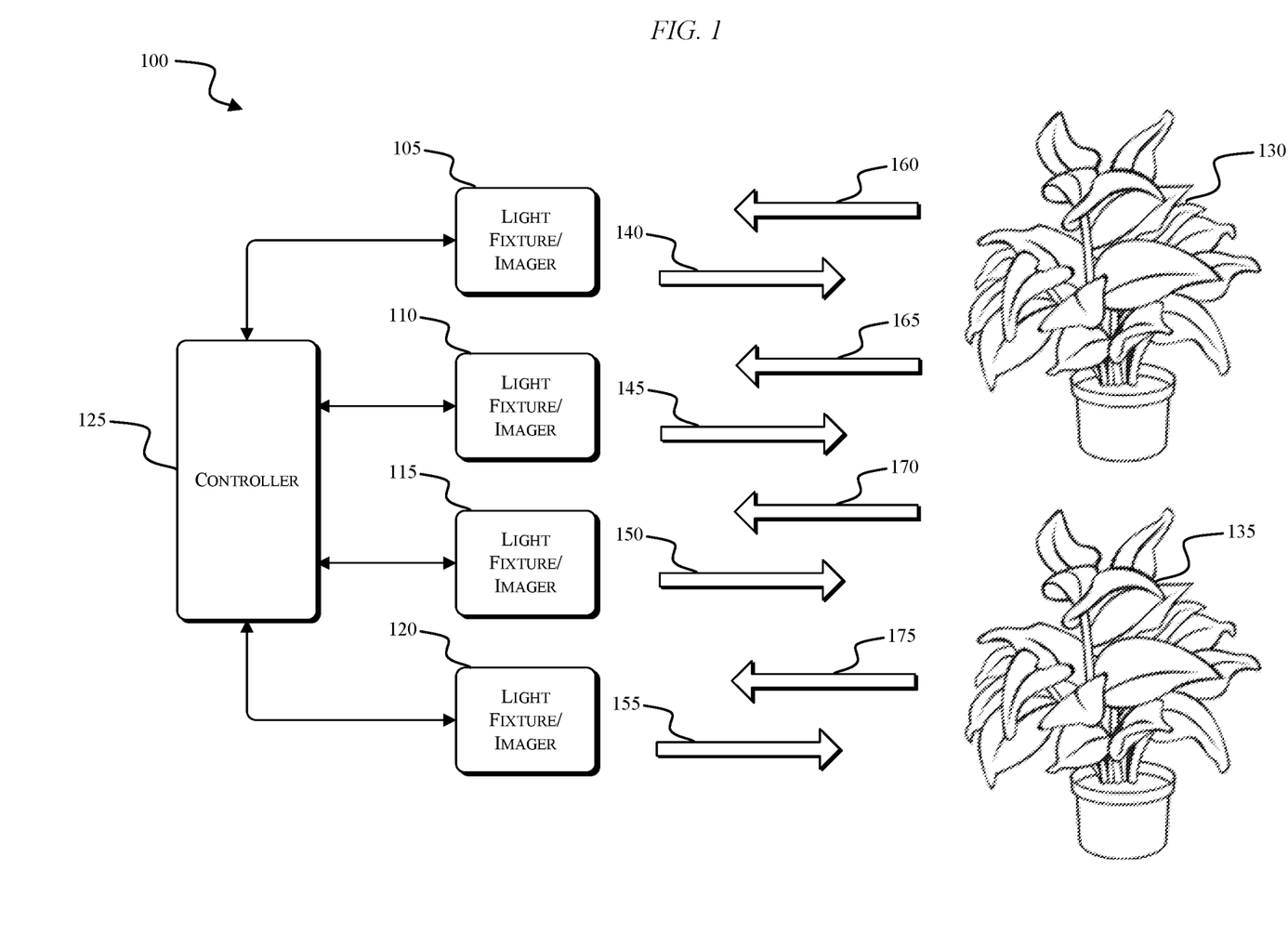
FIG. 1 illustrates a lighting system.

FIG. 1 illustrates a lighting system 100 that includes four light fixtures 105, 110, 115, and 120. In the illustrated embodiment, the light fixtures 105-120 are combined light fixtures and imaging devices or imagers (e.g., including an imaging sensor, a camera, etc.). In other embodiments, imaging devices separate from the light fixtures 105-120 are used. Each of the fixtures/imagers 105-120 is connected to a controller 125 in a wired or wireless manner for receiving control signals that control respective light outputs 140, 145, 150, and 155 of the fixtures/imagers 105-120. The fixtures/imagers 105-120 are configured to be capable of sensing the light 160, 165, 170, and 175 that is reflected off of the surfaces of an object, such as the plants 130, 135. In some embodiments, the fixtures/imagers 105-120 are configured to measure light in the range of approximately 1 micrometer (e.g., infrared light) to approximately 200 nanometers (e.g., ultraviolet light).

Figure 2:
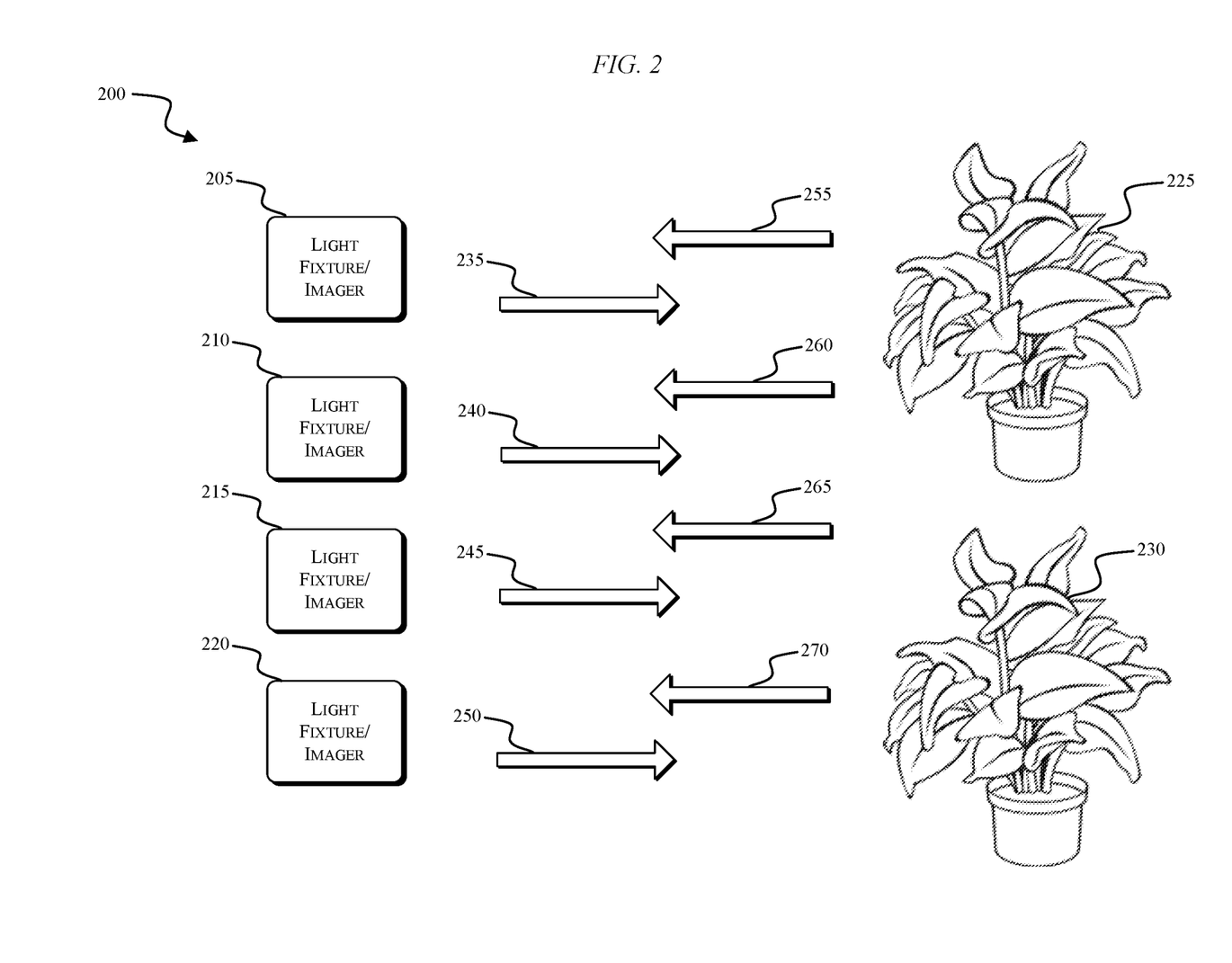
FIG. 2 illustrates a lighting system.

FIG. 2 illustrates a lighting system 200 that includes four light fixtures 205, 210, 215, and 220. In the illustrated embodiment, the light fixtures 205-220 are combined light fixtures and imaging devices or imagers (e.g., including an imaging sensor, a camera, etc.). In other embodiments, imaging devices separate from the light fixtures 205-220 are used. Each of the fixtures/imagers 205-220 includes its own internal controller for controlling respective light outputs 235, 240, 245, and 250 of the fixtures/imagers 205-220. The controllers internal to each of the fixtures/imagers 205-220 operate in a similar manner to the controller 125 in FIG. 1. An exemplary controller for the system 100 or fixtures 205-220 is described with respect to FIG. 3. The fixtures/imagers 205-220 are configured to be capable of sensing the light 255, 260, 265, and 270 that is reflected off of the surfaces of an object, such as the plants 225, 230. In some embodiments, the fixtures/imagers 205-220 are configured to measure light in the range of approximately 1 micrometer (e.g., infrared light) to approximately 200 nanometers (e.g., ultraviolet light).

Figure 3:
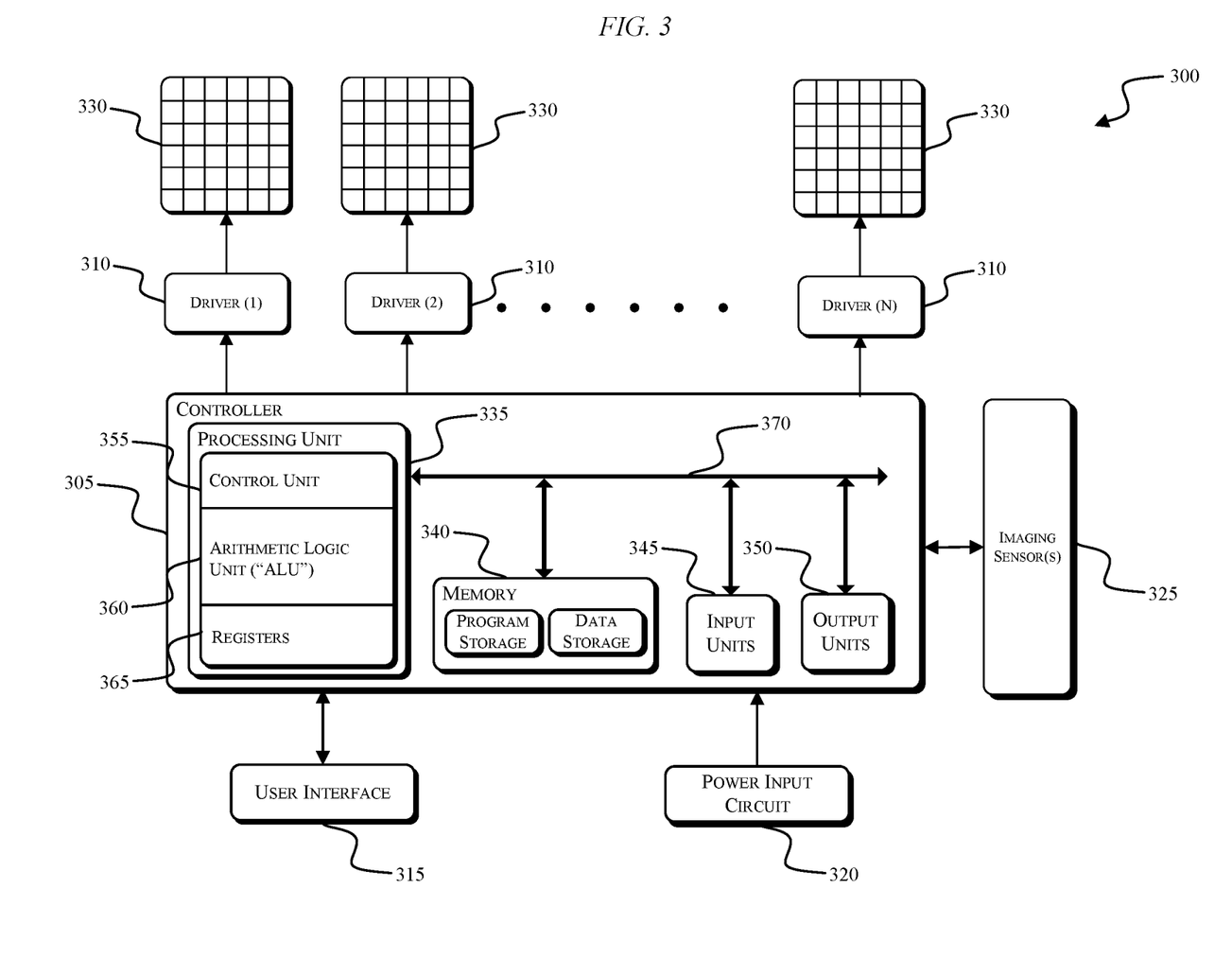
FIG. 3 illustrates a control system for implementing spectral reflectance imaging using narrow band emitters.

FIG. 3 illustrates a system 300 for implementing spectral reflectance imaging using narrow band emitters. A controller 305 for the system 300 is electrically and/or communicatively connected to a variety of modules or components of the system 300. The controller 305 can correspond to, for example, the controller 125 of FIG. 1 or the internal controllers of the fixtures/imagers 205-220. For illustrative purposes, the controller 305 is shown as providing drive signals independently and discretely to a plurality of drivers 310 (e.g., driver [1] to driver [N]). The controller 305 is also connected to a user interface 315, a power input circuit 320, and an imaging sensor 325 (e.g., a monochrome camera). The drivers 310 are each individually connected to an array of light sources 330 (e.g., LEDs). Each array of light sources 330 is configured to generate a narrow band light output (e.g., within a variance range of +/−10 nanometers of central emitter wavelength). Each array of light sources 330 is also configured to emit narrow band light outputs corresponding to different wavelengths of light. For example, a first array of light sources can produce light corresponding to infrared light (e.g., wavelengths in the range of approximately 800 nanometers to 1 micrometer). A final array of light sources can produce light corresponding to ultraviolet light (e.g., wavelengths in the range of approximately 200 nanometers to 400 nanometers). In some embodiments, the system 300 includes at least ten arrays of light sources 330 (e.g., between 10 and 35 arrays of light sources 330). In other embodiments, the system 300 includes fewer than ten arrays of light sources 330. The arrays of light sources 330 can, for example, be spectrally evenly spaced with respect to one another (e.g., consistent wavelength gaps between arrays along the electromagnetic spectrum) or the arrays of light sources 330 can be spectrally unevenly spaced such that some arrays are closer to spectrally adjacent arrays than others. Because the arrays of light sources 330 are spectrally spaced from each other, the corresponding wavelength range of each of the arrays of light sources 330 is discrete from the other wavelength ranges of the others of the arrays of light sources 330.

Each of the arrays of light sources 330 can, for example, be housed in a separate light fixture (such as the fixtures/imagers 105-120 and/or the fixtures/imagers 205-220 described above). Alternatively, at least some of the arrays of light sources 330 can be housed in a common light fixture, with the corresponding drivers 310 still connected to each respective array of light sources 330 for individual control.

The controller 305 includes combinations of hardware and software that are operable to, among other things, control the operation of the system 300, control the output of the arrays of light sources 330 (e.g., sequentially activating spectrally adjacent wavebands), control the operation of the imaging sensor(s) 325, etc. The controller 305 includes a plurality of electrical and electronic components that provide power, operational control, and protection to the components and modules within the controller 305 and/or the system 300. For example, the controller 305 includes, among other things, a processing unit 335 (e.g., a microprocessor, a microcontroller, an electronic processor, an electronic controller, or another suitable programmable device), a memory 340, input units 345, and output units 350. The processing unit 335 includes, among other things, a control unit 355, an arithmetic logic unit ("ALU") 360, and a plurality of registers 365 (shown as a group of registers in FIG. 3), and is implemented using a known computer architecture (e.g., a modified Harvard architecture, a von Neumann architecture, etc.). The processing unit 335, the memory 340, the input units 345, and the output units 350, as well as the various modules connected to the controller 305 are connected by one or more control and/or data buses (e.g., common bus 370). The control and/or data buses are shown generally in FIG. 3 for illustrative purposes.

The memory 340 is a non-transitory computer readable medium and includes, for example, a program storage area and a data storage area. The program storage area and the data storage area can include combinations of different types of memory, such as a ROM, a RAM (e.g., DRAM, SDRAM, etc.), EEPROM, flash memory, a hard disk, an SD card, or other suitable magnetic, optical, physical, or electronic memory devices. The processing unit 335 is connected to the memory 340 and executes software instructions that are capable of being stored in a RAM of the memory 340 (e.g., during execution), a ROM of the memory 340 (e.g., on a generally permanent basis), or another non-transitory computer readable medium such as another memory or a disc. Software included in the implementation of the system 300 can be stored in the memory 340 of the controller 305. The software includes, for example, firmware, one or more applications, program data, filters, rules, one or more program modules, and other executable instructions. The controller 305 is configured to retrieve from the memory 340 and execute, among other things, instructions related to the control processes and methods described herein. In other constructions, the controller 305 includes additional, fewer, or different components.

The user interface 315 is included to provide user input to the system 300 and controller 305. The user interface 315 is operably coupled to the controller 305 to control, for example, the output of the arrays of light sources 330, the imaging sensor 325, etc. The user interface 315 can include any combination of digital and analog input devices required to achieve a desired level of control for the system 300. For example, the user interface 315 can include a computer having a display and input devices, a touch-screen display, a plurality of knobs, dials, switches, buttons, faders, or the like.

The power input circuit 320 supplies a nominal AC or DC voltage to the system 300 and components within the system 300. The power input circuit 320 can be powered by mains power having nominal line voltages between, for example, 100V and 240V AC and frequencies of approximately 50-60 Hz. The power input circuit 320 is also configured to supply lower voltages to operate circuits and components within the system 300 (e.g., controller 305). Additionally or alternatively, the system 300 can receive power from one or more batteries or battery packs.

The system 300 of FIG. 3 is used to illuminate a scene or object using the discretely controllable narrow band arrays of light sources 330. The imaging sensor 325 is positioned to observe and capture images of the scene being illuminated by the individual arrays of light sources 330 (e.g., one array of light sources 330 is used for illumination and image capture at a time). Each pixel of the imaging sensor 325 is also configured to respond to a range of wavelengths between approximately 200 nanometers (e.g., ultraviolet) to 1 micrometer (e.g., infrared) and has a known response curve. In some embodiments, the controller 305 or the imaging sensor 325 normalizes captured images for dynamic range to minimize noise and prevent saturation of the imaging sensor 325. Such a normalization can be performed for each waveband of light produced by the individual arrays of light sources 330. Least common denominator values from the normalization can then be used for image capture to preserve relative ratios of reflectance for each waveband. Each image captured by the imaging sensor 325 can be stored to the memory 340 of the controller 305. The images related to the same imaged object or the same portion of an imaged scene can then be used to reconstruct or generate a full-spectrum color image capable of human viewing.

In some embodiments, the imaging sensor 325 is included within a light fixture (see FIG. 2). In other embodiments, the imaging sensor 325 is separate from a light fixture (see FIG. 1) and provides captured images to the controller 305 in a wired or wireless manner (e.g., using Bluetooth, ZigBee, WiFi, etc.). The imaging sensor 325 is, for example, a monochrome camera that includes only a luminance channel (e.g., no Bayer filter, no color mask, no IR blocking filter, etc.). In some embodiments, such a technique is implemented in a low ambient light environment (e.g., an environment having an approximate 20:1 ratio of light source intensity to ambient light). Additionally, if the imaging sensor 325 implements auto-white balance, such a feature should be disabled or a set of reference images should be captured using a target object (e.g., an object nominally white in appearance, having known spectral reflectance) and post-image compensation should be applied. In some embodiments, the response curve of the imaging sensor 325 to different wavelengths of light is compensated to produce a nominally flat reflectance spectrum for the reference target (e.g., a white reference surface). Additional compensation can be implemented as needed for a particular application of the system 300, such as temperature compensation (e.g., using a temperature sensor), humidity compensation (e.g., using a hygrometer), compensation for chromatic aberration of the camera optics, and other similar compensation techniques employed for image capture and luminance measurement.

The controller 305 is configured to analyze images or image data sets collected from the imaging sensor 325 using pattern detection techniques on the image data sets, such as by implementing specialized machine learning algorithms, Fourier analysis, and other known methods for detecting patterns in images. After the controller 305 has detected patterns in the image data sets, the controller 305 can monitor or track the development of an object (e.g., a plant or crop) in the scene or determine whether the object is experiencing distress or disease. By using a wide range of wavelengths of light produced by the arrays of light sources 330, the controller 305 is able to detect such properties or characteristics of the object that are not viewable from direct observation (e.g., using the human eye).

Figure 4:
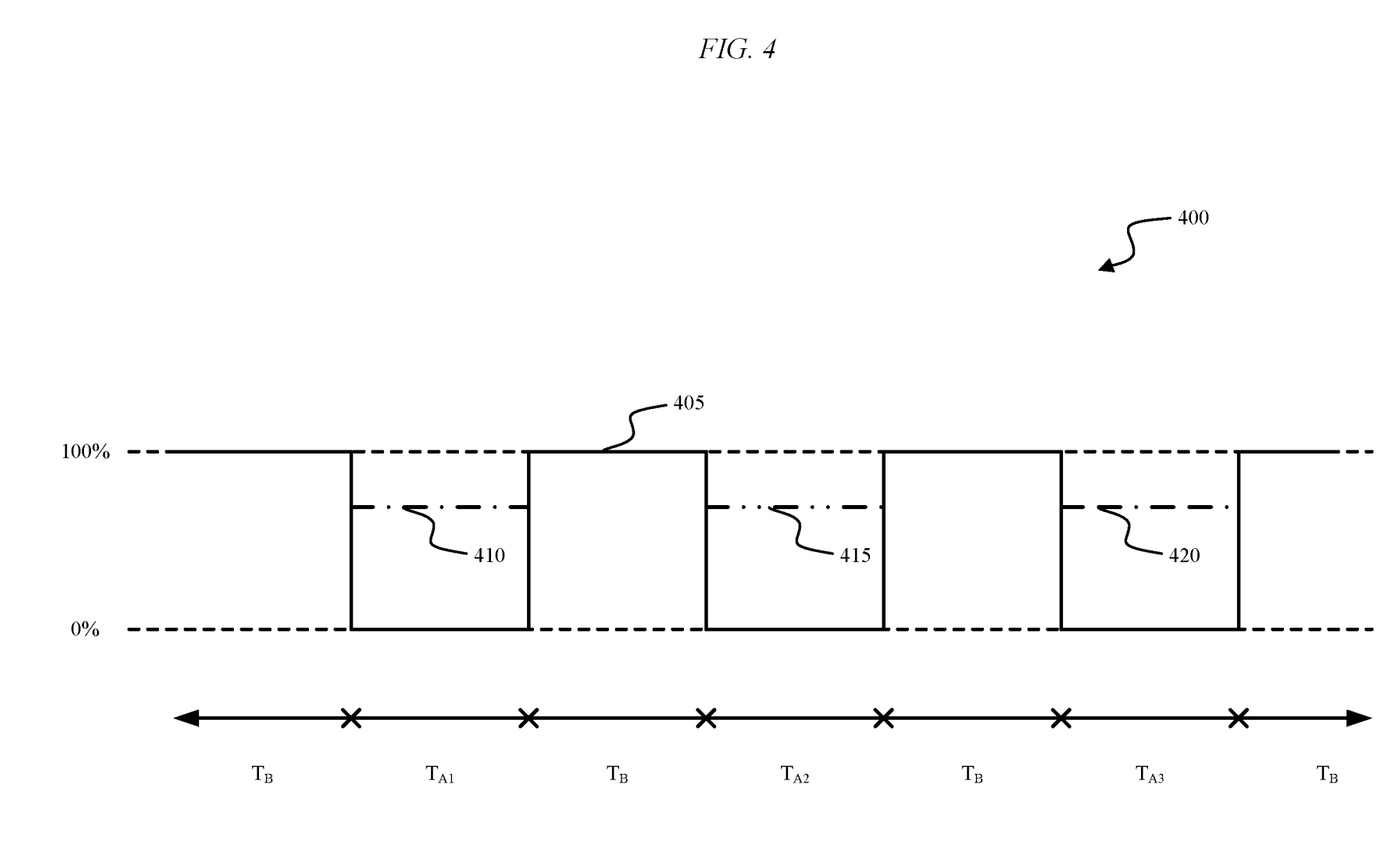
FIG. 4 illustrates a timing diagram for implementing spectral reflectance imaging.

In embodiments where the system 300 is implemented to analyze plants or crops, the photobiological processes of the plants or crops can be directly affected by the light to which they are exposed. As a result, the controller 305 is configured to expose the plants or crops to the light from the arrays of light sources 330 for the minimum amount of time required for the imaging sensor 325 to capture an image. FIG. 4 illustrates a timing diagram 400 according to embodiments described herein. When the controller 305 is not controlling the arrays of light sources 330 and imaging sensor 325 to capture images, the plants or crops should receive only the spectrum of light and radiant power normally required to assure growth in a particular environment or under particular conditions (e.g., indoors). The nominal flux for normal growing or illumination is at 405 in FIG. 4. The time between images, $T_B$, includes the normal growing light source(s) being ON. The time, $T_{A1}$, corresponds to the time when an image is being captured using a flux from a first of the arrays of light sources 330. The intensity of the first array of light sources 330 is at 410 in FIG. 4. The time, $T_{A2}$, corresponds to the time when an image is being captured using a flux from a second of the arrays of light sources 330. The intensity of the second array of light sources 330 is at 415 in FIG. 4. The time, $T_{43}$, corresponds to the time when an image is being captured using a flux from a third of the arrays of light sources 330. The intensity of the third array of light sources 330 is at 415 in FIG. 4. This sequence is continued for each of the arrays of light sources 330 during a particular imaging cycle. In some embodiments, the time for image capture is between two and three times the frame rate of the imaging sensor 325. As a result, at least one and no more than two whole frames would be captured for a single waveband of light produced by one of the arrays of light sources 330. In some embodiments, an imaging cycle lasts approximately 5-10 seconds. Therefore, the implementation of spectral reflectance imaging by the system 300 interferes as little as possible with the plant or crop being analyzed.

Although FIG. 4 illustrates embodiments including discrete (e.g., separate) time periods for each of the light source 330 activations 410, 415, 420, some embodiments may include overlap of the activations 410, 415, 420. With regard to such embodiments, the imaging sensor(s) 325 activate to sense reflected light only while one of the light source 330 activations 410, 415, 420 is ongoing. Stated another way, the illumination sensing periods in which the imaging sensor(s) 325 senses reflected light at respective wavelength ranges are discrete time periods in that they do not overlap temporally. For example, the first array of light sources 330 activates to illuminate the scene with light (such as light 140 or light 235) in a first wavelength range. Then, the imaging sensor(s) 325 activates during a first illumination sensing period to detect reflected light (such as light 160 or light 255) in the first wavelength range. Next, the imaging sensor(s) 325 deactivates to end the first illumination sensing period. Now that the first illumination sensing period has ended, the first array of light sources 330 may be extinguished contemporaneously or may be extinguished at a later time. Further, the second array of light sources 330 activates to illuminate the scene with light (such as light 145 or light 240) in a second wavelength range. This activation of the second array of light sources 330 may occur before the first array of light sources 330 have been extinguished or may happen after the first array of light sources 330 have been extinguished, but the activation of the second array of light sources 330 does not happen until after the end of the first illumination sensing period. Once the first array of light sources 330 have been extinguished and the second array of light sources 330 have been activated, the imaging sensor(s) 325 activate to begin a second illumination sensing period. The process continues in such a manner until all the different arrays of light sources 330 corresponding to respective light wavelength ranges have operated.

Figure 5:
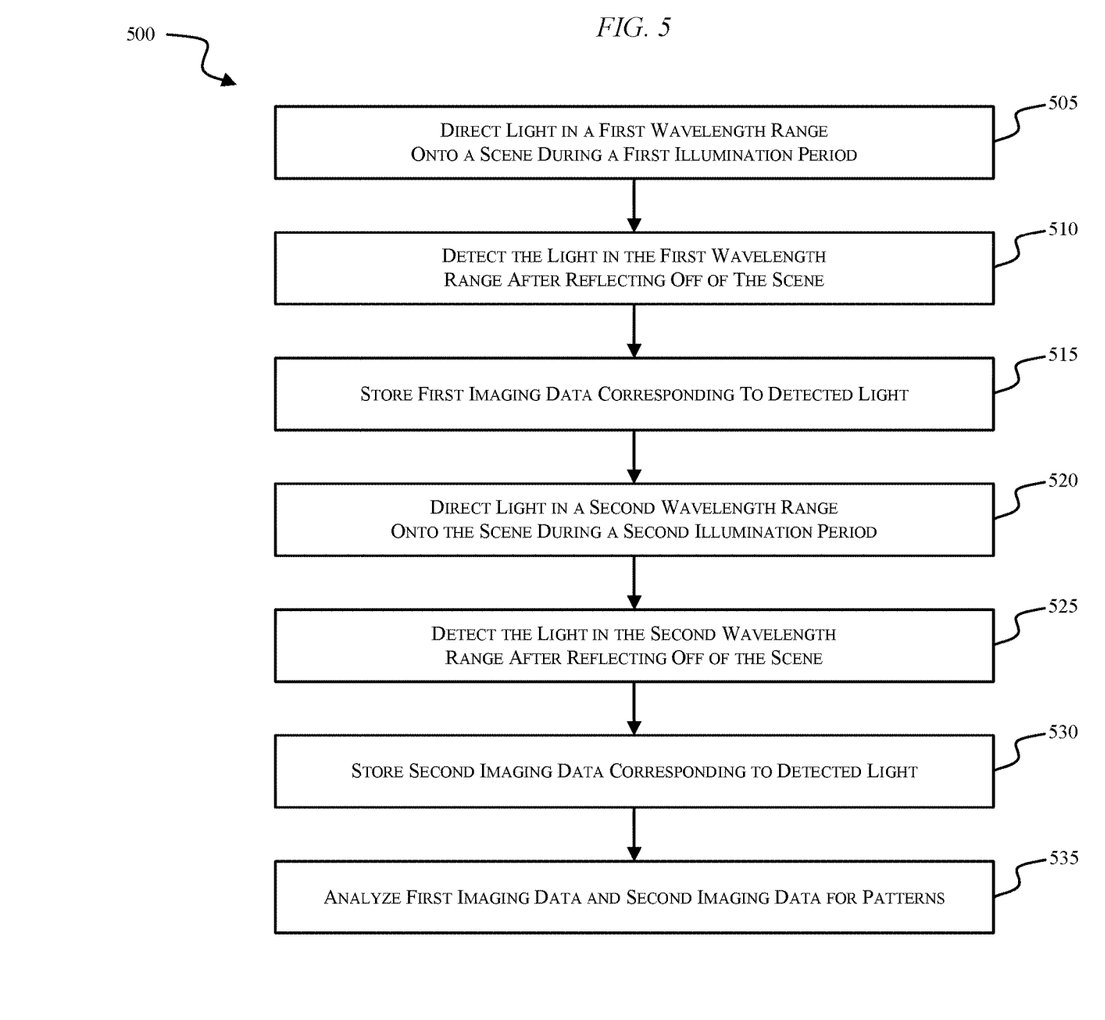
FIG. 5 illustrates a method of obtaining a multispectral image.

A method 500 of obtaining a multispectral image of a scene is shown in FIG. 5. The method 500 may be performed using, for instance, the system 300 described above. The method 500 includes a first step 505 of directing light (such as light 140 or light 235) in a first wavelength range (such as 800 nanometers to 1 micrometer) onto a scene or an object (such as plants 130, 135 or plants 225, 230) during a first illumination period (such as time $T_{41}$). Next, the method 500 includes a second step 510 of detecting light (such as light 160 or light 255) in the first wavelength range (by, for instance, the imaging sensor 325) reflected off of the scene during a first illumination sensing period. First imaging data corresponding to the detected light is then stored (by, for instance, the controller 305) in a third step 515. Then, the method 500 includes a fourth step 520 of directing light (such as light 145 or light 240) in a second wavelength range onto the scene during a second illumination period (such as time $T_{42}$). Light (such as light 165 or light 260) in the second wavelength range reflected off of the scene is detected during a second illumination sensing period in a fifth step 525 of the method 500. Second imaging data corresponding to the detected light is then stored (by, for instance, the controller 305) in a sixth step 530. During a seventh step 535, the first imaging data and the second imaging data are then analyzed for patterns as described above (by, for instance, the controller 305). The method 500 can include further steps of directing light, detecting reflected light, and storing imaging data corresponding to additional wavelength ranges of light emitted by additional light sources. These further steps can occur prior to the analysis step, such that the analysis is performed only once during the analysis step. Alternatively, the analysis may occur continually or continuously during the method 500.

Thus, embodiments described herein provide, among other things, systems, devices, and methods for implementing spectral reflectance imaging using narrow band emitters.

What is claimed is:

1. A system for obtaining a multispectral image of a scene, the system comprising:
   a nominal light source configured to emit a nominal flux onto the scene;
   a first light source configured to emit light in a first wavelength range onto the scene;
   a second light source configured to emit light in a second wavelength range onto the scene;
   at least one imaging sensor configured to
      sense light in the first wavelength range reflected off of the scene during a first illumination sensing period; and
      sense light in the second wavelength range reflected off of the scene during a second illumination sensing period;
   a controller connected to the at least one imaging sensor, the controller configured to receive signals from the at least one imaging sensor as imaging data;
      store the imaging data; and
      analyze the imaging data with regard to a plurality of dimensions; and
   wherein the first illumination sensing period and the second illumination sensing period are discrete time periods; and wherein the nominal light source is off during the first illumination sensing period and the second illumination sensing period.

2. The system of claim 1, wherein
   the controller is connected to the first light source and the second light source, and
   the controller is configured to activate and deactivate each of the first light source and the second light source.

3. The system of claim 1, wherein the first wavelength range and the second wavelength range are discrete ranges.

4. The system of claim 3, wherein the first wavelength range is 800 nanometers to 1 micrometer.

5. The system of claim 4, wherein the second wavelength range is 200 nanometers to 400 nanometers.

6. The system of claim 3, further comprising a plurality of light sources, the plurality of light sources including the first light source, the second light source, and a third light source configured to emit light in a third wavelength range onto the scene.

7. The system of claim 6, wherein the wavelength ranges of the light sources are evenly spaced along a spectrum.

8. The system of claim 6, wherein the wavelength ranges of the light sources are unevenly spaced along a spectrum.

9. The system of claim 6, wherein:
the plurality of light sources includes ten light sources; and
each of the ten light sources is configured to emit light in a corresponding discrete wavelength range.

10. The system of claim 1, wherein each of the first imaging sensor and the second imaging sensor includes a monochrome camera.

11. The system of claim 1, wherein the plurality of dimensions includes first and second dimensions corresponding to x-y spatial dimensions of an imaged object.

12. The system of claim 11, wherein the plurality of dimensions includes a third dimension corresponding to a spectral dimension of the imaged object.

13. The system of claim 12, wherein the plurality of dimensions includes a fourth dimension corresponding to a time of capture of the imaged object.

14. The system of claim 1, wherein
the first light source includes a first array of light-emitting diodes, and
the second light source includes a second array of light-emitting diodes.

15. The system of claim 1, wherein the at least one imaging sensor includes a first imaging sensor and a second imaging sensor,
the first imaging sensor is configured to sense light in the first wavelength range reflected off of the scene during the first illumination sensing period, and
the second imaging sensor is configured to sense light in the second wavelength range reflected off of the scene during the second illumination sensing period.

16. The system of claim 15, further comprising:
a first fixture including:
the first light source, and
the first imaging sensor,
a second fixture including:
the second light source, and
the second imaging sensor, and
wherein the controller is further connected to the first light source and the second light source.

17. A system for obtaining a multispectral image of a scene, the system comprising:
a nominal light source configured to emit a nominal flux onto the scene;
a first light source configured to emit light in a first wavelength range onto the scene;
a second light source configured to emit light in a second wavelength range onto the scene;
a first imaging device including:
a first monochromatic imaging sensor configured to sense light reflected off of the scene during a first illumination sensing period;
a first controller connected to the first monochromatic imaging sensor, the first controller configured to:
receive signals from the first monochromatic imaging sensor as first imaging data;
store the first imaging data; and
analyze pattern data of the first imaging data with regard to a plurality of dimensions;
a second imaging device including:
a second monochromatic imaging sensor configured to sense light reflected off of the scene during a second illumination sensing period;
a second controller connected to the second monochromatic imaging sensor, the second controller configured to:
receive signals from the second monochromatic imaging sensor as second imaging data;
store the second imaging data; and
analyze pattern data of the second imaging data with regard to the plurality of dimensions; and
wherein the first illumination sensing period and the second illumination sensing period are discrete;
wherein the nominal light source is off during the first illumination sensing period and the second illumination sensing period; and wherein the multispectral image of the scene is generated or reconstructed using the first imaging data and the second imaging data.

18. The system of claim 17, further comprising:
a first fixture including:
the first light source, and
the first imaging device,
a second fixture including:
the second light source, and
the second imaging device, and
wherein
the first controller is further connected to the first light source, and
the second controller is further connected to the second light source.

19. The system of claim 17, wherein the first controller and the second controller are configured to communicate with each other.

20. A method of obtaining a multispectral image of a scene, the method comprising:
directing a nominal light with a nominal flux onto the scene;
directing light in a first wavelength range onto the scene;
detecting, using a monochrome camera, the light in the first wavelength range after the light has reflected off of the scene during a first illumination sensing period, wherein the nominal light is off during the first illumination sensing period;
storing first imaging data corresponding to the detected light in the first wavelength range;
directing light in a second wavelength range, which is different than the first wavelength range, onto the scene after the first illumination sensing period;
detecting, using the monochrome camera, the light in the second wavelength range after the light has reflected off of the scene during a second illumination sensing period, the second illumination sensing period beginning after the first illumination sensing period has ended, and wherein the nominal light is off during the second sensing period;
storing second imaging data corresponding to the detected light in the second wavelength range;
analyzing the first imaging data and the second imaging data to identify one or more patterns; and
generating or reconstructing a multispectral image.

* * * * *